(12) United States Patent
Miyamoto

(10) Patent No.: US 9,262,061 B2
(45) Date of Patent: Feb. 16, 2016

(54) DISPLAY CONTROL DEVICE FOR CONSTRUCTION MACHINE

(71) Applicant: Hitachi Construction Machinery Co., Ltd., Bunkyo-ku, Tokyo (JP)

(72) Inventor: Toshiyuki Miyamoto, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/379,650

(22) PCT Filed: Feb. 20, 2013

(86) PCT No.: PCT/JP2013/054132
§ 371 (c)(1),
(2) Date: Aug. 19, 2014

(87) PCT Pub. No.: WO2013/125561
PCT Pub. Date: Aug. 29, 2013

(65) Prior Publication Data
US 2015/0020026 A1 Jan. 15, 2015

(30) Foreign Application Priority Data

Feb. 20, 2012 (JP) ................................. 2012-033995

(51) Int. Cl.
*G06F 3/0484* (2013.01)
*G06F 3/0482* (2013.01)
(Continued)

(52) U.S. Cl.
CPC .............. *G06F 3/0484* (2013.01); *B60K 35/00* (2013.01); *B60K 37/06* (2013.01); *E02F 9/26* (2013.01);
(Continued)

(58) Field of Classification Search
CPC ... G06F 3/0238; G06F 3/0489; G06F 1/1671; G06F 3/0484; H04M 1/7258; G05B 2219/36126; B60K 35/00; B60K 2350/1032
See application file for complete search history.

(56) References Cited

U.S. PATENT DOCUMENTS 4,680,729 A * 7/1987 Steinhart ....................... 345/173
5,386,459 A * 1/1995 Veeneman et al. ......... 379/93.01
(Continued)

FOREIGN PATENT DOCUMENTS

JP 5-7386 A 1/1993
JP 2568497 Y2 1/1997
(Continued)

OTHER PUBLICATIONS

International Search Report dated Jun. 4, 2013 with English translation (five (5) pages).

*Primary Examiner* — Nicholas Ulrich
(74) *Attorney, Agent, or Firm* — Crowell & Moring LLP

(57) ABSTRACT

A display control device for a construction machine includes: a display control unit that controls a display content of a screen including various pieces of information; a first operation member group having a plurality of operation members that receive a plurality of kinds of first operated input, respectively, for the screen; a second operation member group that receives a second operated input for performing a substitute setting in which one of the plurality of kinds of first operated input by one operation member of the plurality of operation members is substituted by an input by another operation member; a third operation member that receives a third operated input for starting the substitute setting; and a setting unit that causes a substitute setting screen for performing the substitute setting in response to the third operated input to be displayed and that decides a content of the substitute setting according to the second operated input on the substitute setting screen, wherein when the first operated input received by the first operation member group corresponds to the content of the substitute setting that is decided by the setting unit, the display control unit controls display of the screen according to the content of the substitute setting.

7 Claims, 15 Drawing Sheets

(51) Int. Cl.
   *B60K 35/00* (2006.01)
   *G06F 3/023* (2006.01)
   *E02F 9/26* (2006.01)
   *B60K 37/06* (2006.01)
   *G06F 3/0489* (2013.01)

(52) U.S. Cl.
   CPC .......... *G06F 3/0482* (2013.01); *G06F 3/04842* (2013.01); *B60K 2350/1028* (2013.01); *B60K 2350/1032* (2013.01); *B60K 2350/1048* (2013.01); *B60K 2350/352* (2013.01); *B60Y 2200/41* (2013.01); *G06F 3/0238* (2013.01); *G06F 3/0489* (2013.01)

(56) References Cited

U.S. PATENT DOCUMENTS

| | | | |
|---|---|---|---|
| 6,215,474 B1 * | 4/2001 | Shah | 345/168 |
| 6,250,548 B1 * | 6/2001 | McClure et al. | 235/51 |
| 6,363,264 B1 * | 3/2002 | Overy et al. | 455/566 |
| RE39,959 E * | 12/2007 | Sudo et al. | 455/564 |
| 7,661,073 B2 * | 2/2010 | Lausterer et al. | 715/810 |
| 8,103,972 B2 * | 1/2012 | Scheuermann | 715/847 |
| 2002/0158915 A1 * | 10/2002 | Rowell et al. | 345/835 |
| 2004/0239637 A1 * | 12/2004 | Williams et al. | 345/172 |
| 2008/0024458 A1 * | 1/2008 | Nieminen | 345/173 |
| 2009/0210922 A1 * | 8/2009 | White et al. | 725/151 |
| 2010/0281431 A1 * | 11/2010 | Kano et al. | 715/835 |
| 2010/0283636 A1 * | 11/2010 | Clark et al. | 340/971 |

FOREIGN PATENT DOCUMENTS

| | | |
|---|---|---|
| JP | 2000-100271 A | 4/2000 |
| JP | 2003-98121 A | 4/2003 |
| JP | 2004-207060 A | 7/2004 |
| JP | 2012-171597 A | 9/2012 |

* cited by examiner (a)

| SWITCH COMMAND INPUT VALUE | SUBSTITUTE INPUT VALUE |
|---|---|
| DECISION | SELECTION ↑ , SELECTION ↓ DOUBLE PRESSING |
|  |  |
|  |  |
|  |  |
|  |  |
|  |  |

TB

DISPLAY CONTROL DEVICE FOR CONSTRUCTION MACHINE

TECHNICAL FIELD

The present invention relates to a display control device for a construction machine.

BACKGROUND ART

Heretofore, a work vehicle is known, which includes a console switch panel on which various types of switches and the like are arranged (cf., for example, Patent Document 1).

CITATION LIST

Patent Literature

Patent Document 1: Japan Utility Model Registration No. 2568497.

SUMMARY OF INVENTION

Technical Problem

However, in case that switches at fault cannot be restored immediately, the work vehicle need be stopped so that work processes or the like are adversely affected. In particular, a large work vehicle or a work machine for mining are operated in principle regardless of the time of day and night and interruption of the work causes an increase in cost.

Solution to Problem

According to the 1st aspect of the present invention, a display control device for a construction machine, comprises: a display control unit that controls a display content of a screen including various pieces of information; a first operation member group having a plurality of operation members that receive a plurality of kinds of first operated input, respectively, for the screen; a second operation member group that receives a second operated input for performing a substitute setting in which one of the plurality of kinds of first operated input by one operation member of the plurality of operation members is substituted by an input by another operation member; a third operation member that receives a third operated input for starting the substitute setting; and a setting unit that causes a substitute setting screen for performing the substitute setting in response to the third operated input to be displayed and that decides a content of the substitute setting according to the second operated input on the substitute setting screen, wherein when the first operated input received by the first operation member group corresponds to the content of the substitute setting that is decided by the setting unit, the display control unit controls display of the screen according to the content of the substitute setting.

According to the 2nd aspect of the present invention, in the display control device for a construction machine according to the 1st aspect, it is preferred that when a number of days from a time when the content of the substitute setting is decided by the setting unit to a time when the operated input by the third operation member is received is equal to or more than a predetermined number of days, the display control unit does not perform the display of the substitute setting screen.

According to the 3rd aspect of the present invention, in the display control device for a construction machine according to the 1st or 2nd aspect, it is preferred that the display control device further comprises a canceling unit that cancels the content of the substitute setting that is set by the setting unit.

According to the 4th aspect of the present invention, in the display control device for a construction machine according to any one of the 1st to 3rd aspects, it is preferred that the setting unit decides a content of substitute setting out of the contents of the substitute setting, according to the second operated input.

According to the 5th aspect of the present invention, in the display control device for a construction machine according to the 2nd aspect, it is preferred that: the display control device further comprises a storing unit that stores the content of the substitute setting decided by the setting unit, a flag indicating that the substitute setting is valid, and a date on which the substitute setting is decided; and the setting unit prohibits start of the substitute setting when a difference between the date that is stored in the storing unit and a date on which the operated input by the third operation member is received is equal to or more than the predetermined number of days.

According to the 6th aspect of the present invention, in the display control device for a construction machine according to the 3rd aspect, it is preferred that: the display control device further comprises a storing unit that stores the content of the substitute setting decided by the setting unit, a flag indicating that the substitute setting is valid, and a date on which the substitute setting is decided; and the canceling unit clears the content of the substitute setting, the flag, and the date that are stored in the storing unit.

According to the 7th aspect of the present invention, in the display control device for a construction machine according to the 3rd or 6th aspect, it is preferred that the first operation member group includes a selecting operation member for selecting a setting of display state switching of the screen, a deciding operation member for deciding the setting that is selected by the selecting operation member, and a canceling operation member for canceling the setting decided with the deciding operation member.

According to the 8th aspect of the present invention, in the display control device for a construction machine according to the 1st or 4th aspect, it is preferred that the second operation member group includes an input value selecting operation member for selecting an input value for the substitute setting, and an input value deciding operation member for deciding the input value selected with the input value selecting operation member.

Advantageous Effect of Invention

According to the present invention, the display of a screen can be controlled by performing a substitute setting in which an operation command to be input through one operation member in a first operation member group is substituted with by an operation command to be input through one or more other operation members and controlling the display according to a content of the substitute setting.

BRIEF DESCRIPTION OF DRAWINGS

FIG. 10 presents a diagram explaining a substitute setting table;

DESCRIPTION OF EMBODIMENTS

Figure 1:
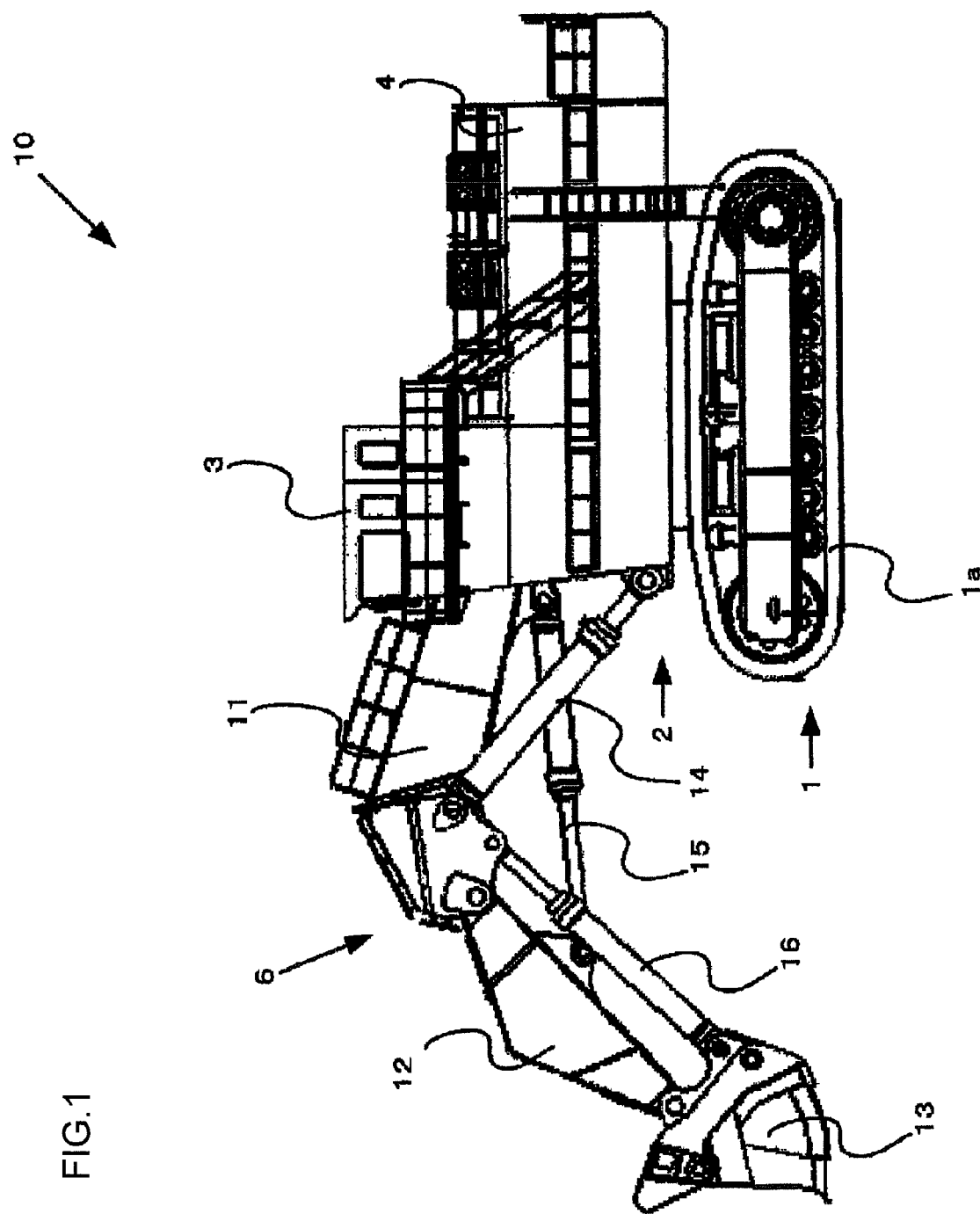
FIG. 1 presents an outline side view showing a hydraulic excavator according to an embodiment of the present invention.

Referring to the attached drawings, a big hydraulic excavator is explained as an example of a construction machine according to an embodiment of the present invention. FIG. 1 presents an outline side view showing a hydraulic excavator 10. The hydraulic excavator includes a traveling body 1 and a swiveling body 2 that is swivelably provided on the traveling body 1. The swiveling body 2 includes a operator cab 3 provided on an upper part of the swiveling body 2, an engine room 4 provided on a rear part of the swiveling body 2, and a front device 6 of a multi joint type that is attached anteriorly to the swiveling body 2. The front device 6 includes a boom 11, an arm 12, and a bucket 13.

The traveling body 1 includes a pair of crawler tracks 1a. The crawler tracks 1a are driven by a traveling motor (not shown). The swiveling body 2 is swiveled relative to the traveling body 1 by a swiveling motor (not shown) provided in a central part of the swiveling body. The boom 11, the arm 12, and the bucket 13 are turned by extension and retraction of a boom cylinder 14, an arm cylinder 15, and a bucket cylinder 16, respectively. The respective motors and the respective cylinders are driven under hydraulic pressure from a hydraulic pump (not shown).

Figure 2:
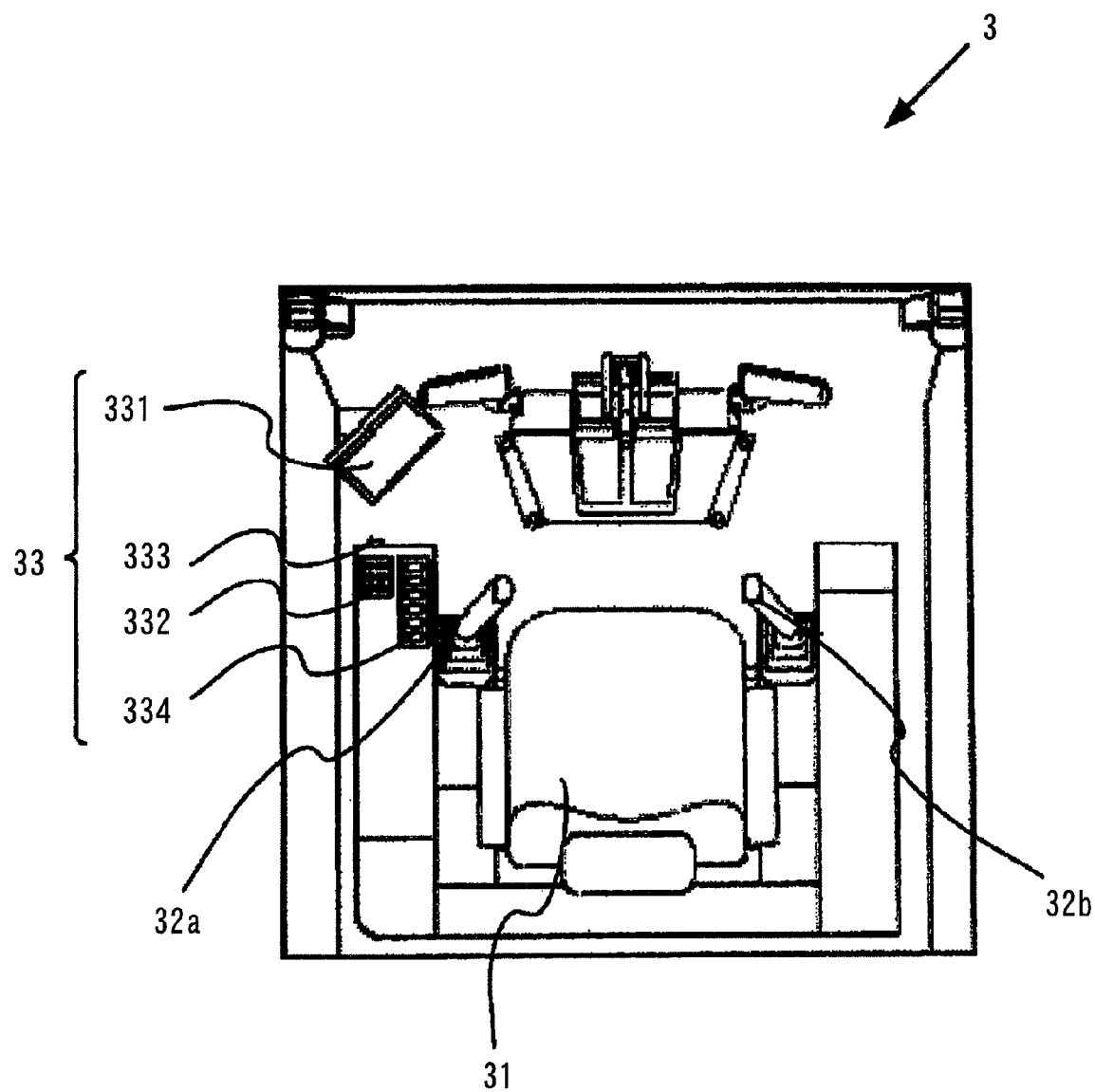
FIG. 2 presents an inside plan view of an operator cab.

Referring to the plan view in FIG. 2, the inside of the operator cab 3 is explained. In FIG. 2, it is assumed that an upper side of the drawing corresponds to the anterior of the hydraulic excavator 10. The operator cab is provided with a driver seat 31, operating levers 32a and 32b positioned on each side of and in front of the driver seat 31, and a display control device 33. The display control device 33 includes a display monitor 331, a set value inputting operation member 332, a substitute setting screen switch commanding operation member 333, and a display state switch commanding operation member 334. On the display monitor 331 are displayed characters and/or images according to the control by the controller described later. The set value inputting operation member 332 is constituted by a button, a switch or the like that is operated by the operator when a set value is input on the substitute setting screen described later. The substitute setting screen switch commanding operation member 333 is constituted by a button, a switch, etc., that is operated by the operator when the display of the display monitor 331 is switched to the substitute setting screen. The display state switch commanding operation member 334 is constituted by a button, a switch or the like that is operated by the operator when the display content that is displayed on the display monitor 331 is switched. The set value inputting operation member 332, the substitute setting screen switch commanding operation member 333, and the display state switch commanding operation member 334 output operation signals according to the respective operations by the operator to the controller.

Figure 3:
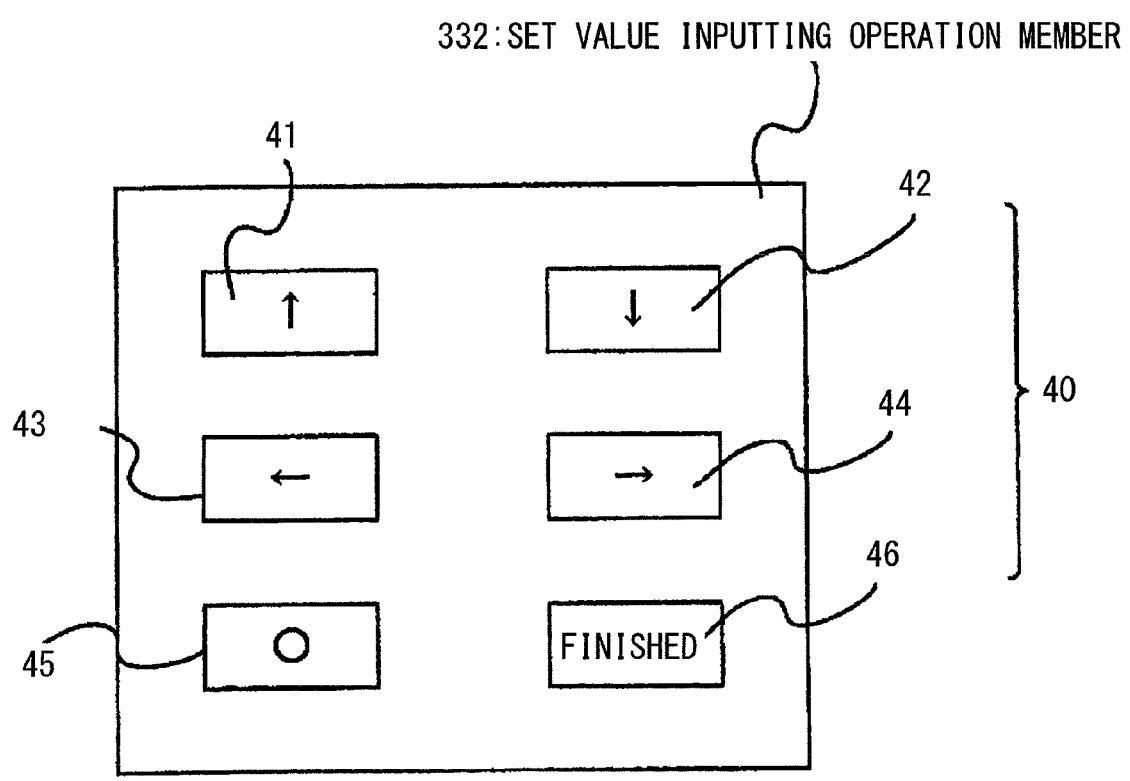
FIG. 3 presents a plan view explaining a set value inputting unit.

FIG. 3 presents a plan view explaining various types of buttons that constitute the set value inputting operation member 332. The set value inputting operation member 332 is provided with a set value inputting button group 40, which includes a "↑" key 41, a "↓" key 42, a "←" key 43, a "→" key 44, a "O" key 45, and a "finished" key 46. When various types of input values are to be selected, the operator performs selection operation to select either one of the "↑" key 41, the "↓" key 42, the "←" key 43, the "→" key 44, and the "O" key 45, and operates the "finished" key 46 in order to decide the input value selected by the selection operation. This operation is called herein an input value deciding operation.

Figure 4:
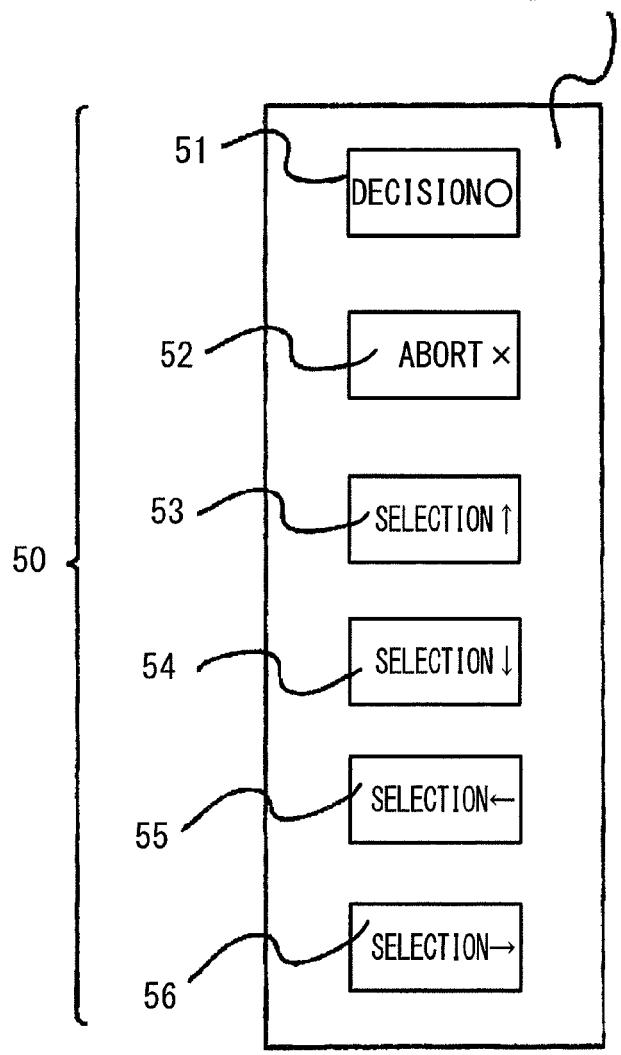
FIG. 4 presents a plan view explaining a display state switch commanding unit.

FIG. 4 presents a plan view explaining various types of buttons that constitute the display state switch commanding operation member 334. The display state switch commanding operation member 334 is provided with a display switch button group 50, which includes a "decision O" key 51, an "abort X" key 52, a "selection ↑" key 53, a "selection ↓" key 54, a "selection ←" key 55, and a "selection →" key 56. When selecting a setting of switching of various display states, the operator performs selection operation to select either one of "the selection ↑" key 53, the "selection ↓" key 54, the "selection ←" key 55, and the "selection →" key 56 and operates the "decision O" key 51 in order to settle the setting selected by the selection operation. Herein, this operation is called a settling operation. In case that the setting decided by the switch decision operation is canceled and the display of the display monitor 331 is returned to the previous one, the operator operates the "abort X" key 52. Herein, this operation is called an abort operation.

Figure 5:
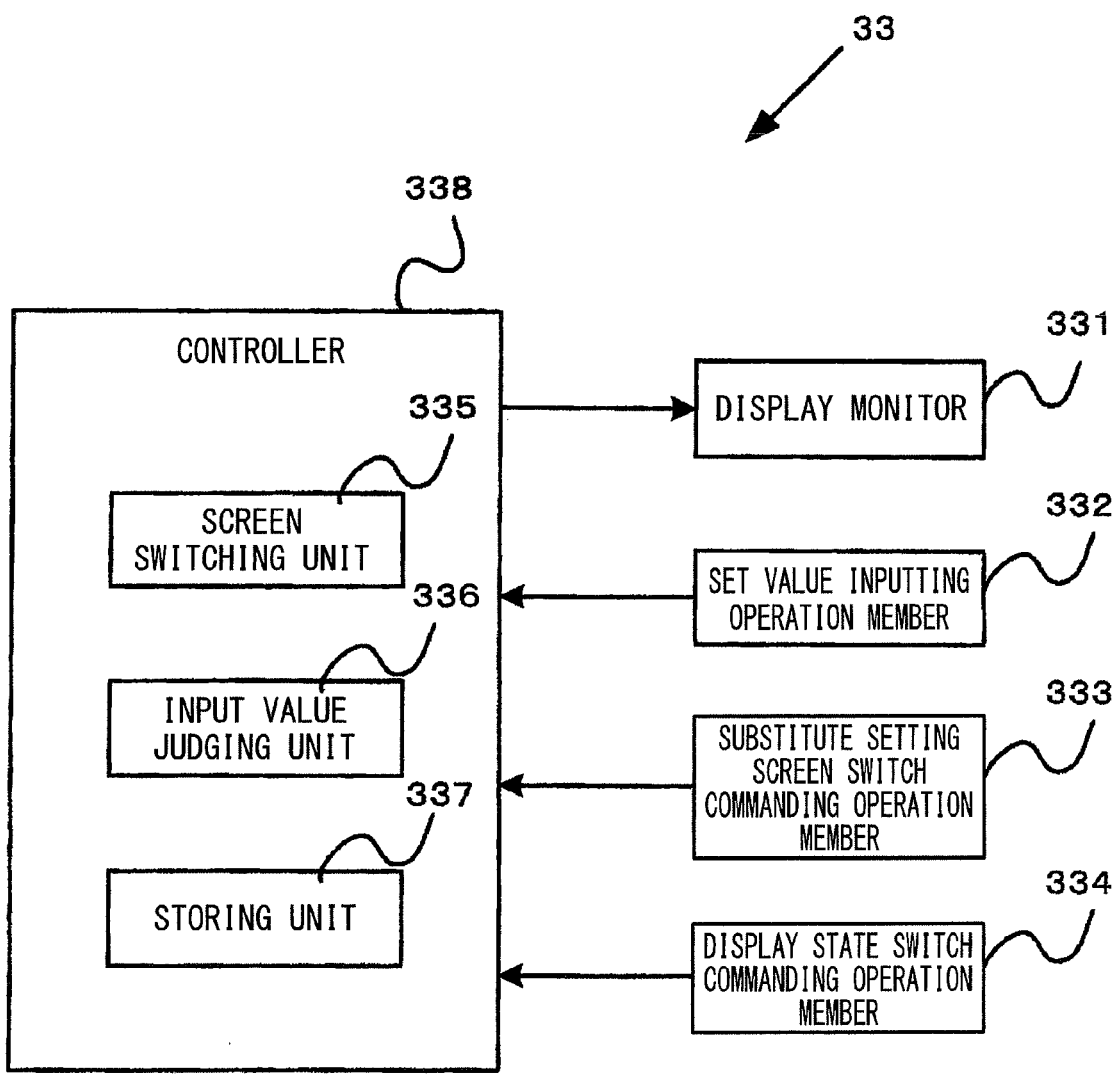
FIG. 5 presents a block diagram explaining a configuration of a main portion of the display control device.

Referring to the block diagram in FIG. 5, a control system of the display control device 33 is explained in detail. Note that in FIG. 5, to the same constructions as those shown in FIG. 2, the same reference numerals are given. As shown in FIG. 5, the display control device 33 includes a display monitor 331, a set value inputting operation member 332, a substitute setting screen switch commanding operation member 333, a display state switch commanding operation member 334, and a controller 338.

The controller 338, which is constituted by peripheral circuits such as a CPU and a ROM, (not shown), performs various calculations based on the input operation signals to control the display of the display monitor 331. The controller 338 functionally includes a screen switching unit 335, an input value judging unit 336, and a storing unit 337. The screen switching unit 335 switches the display content to be displayed by the display monitor 331 according to the operation signal that is input from the display state switch commanding operation member 334. The input value judging unit 336 judges the input value that is input by the inputting operation by the operator according to the operation signal that is input from the set value inputting operation member 332 or the display state switch commanding operation member 334. The storing unit 337 is a non-volatile storage medium for storing a failure occurring date and substitute setting table data described later.

The display control device 33 according to the present embodiment is configured such that when one button out of the buttons of the display state switch commanding operation member 334 is in failure, a substitute setting of one or more buttons can be performed so as to enable the operation to be operated with the one button. In other words, in case that any one of the display switching button group 50 is in failure, the display control device 33 continues the display switching processing by causing the operation corresponding to the button in failure to be assigned to one or more buttons that are not in failure. In the following explanation, a case in which no failure occurs to the display switch button group 50 and a case in which the display switch button group 50 is in failure are separately described.

In Case that No Failure has Occurred

Figure 6:
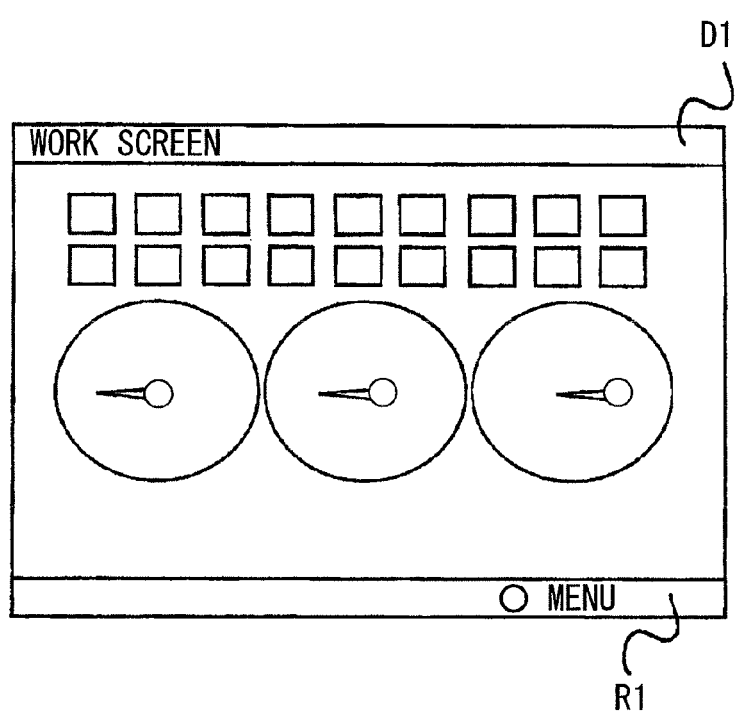
FIG. 6 presents a diagram explaining an example of a screen displayed on a display monitor.
Figure 6:
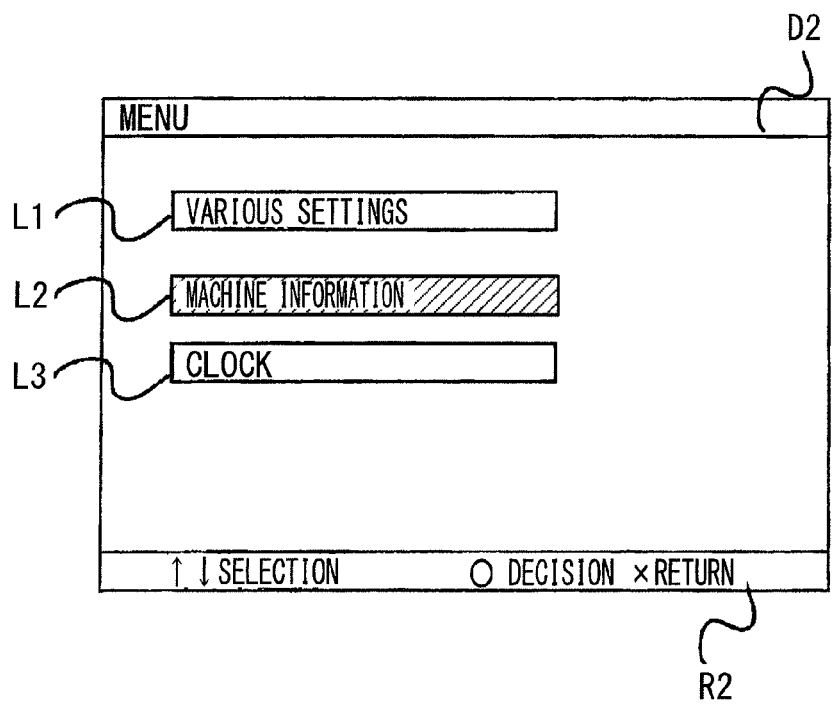
Figure 7:
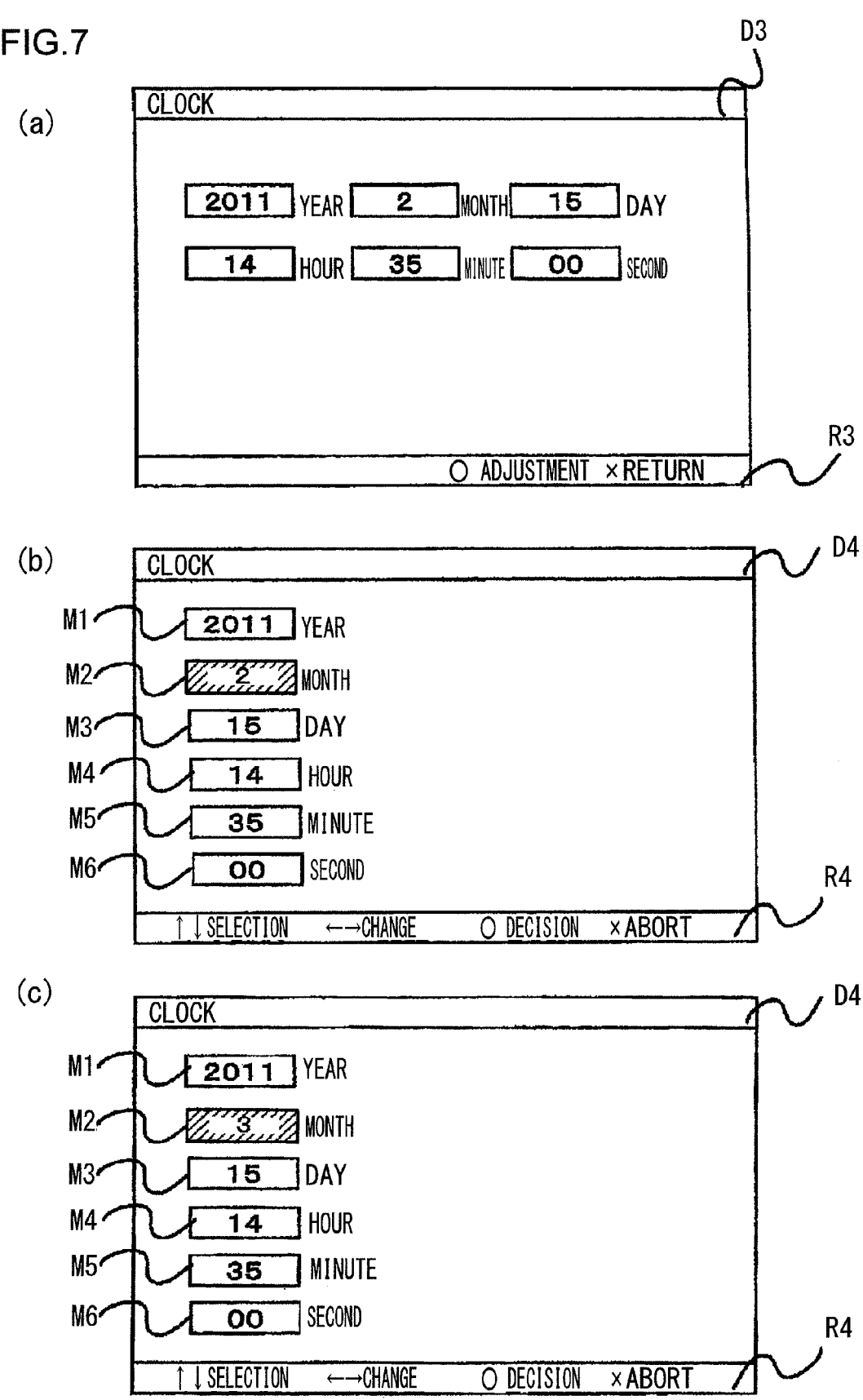
FIG. 7 presents a diagram explaining an example of a screen displayed on a display monitor.

Explanation is made on the display state switching processing of the display monitor 331 caused by the display control device 33 when no failure has occurred to the display switch button group 50 and on an example of the screen displayed by the display monitor 331. FIGS. 6 and 7 present diagrams showing various screens displayed on the display monitor 331. FIG. 6(a) shows a work screen D1. On the work screen D1 are displayed various pieces of information, for example, a speed meter, a tacho meter, a fuel level meter, and various lamps. Below the work screen D1 displayed on the display monitor 311 is displayed a guide region R1 that guides a switching operation to switch between display states. As shown in FIG. 6(a), "O menu" is displayed in the guide region R1 when the work screen D1 is displayed. The display of the "O menu" indicates that by performing decision operation by using the "decision O" key 51 contained in the display state switch commanding unit 334, the display state is switched from the work screen D1 to the menu screen for allowing various settings to be made.

FIG. 6(b) shows an example of a menu screen D2. As shown in FIG. 6(b), items L1 to L3 that can be set by the operator, for example, "various settings", "machine information", and "clock" are displayed on the menu screen D2. When the menu screen D2 is displayed on the display monitor 331, "↑↓ selection", "O decision", and "X return" are displayed in the guide region R2. That is, the operator can select a desired one of the three items L1 to L3 that can be set by the operator by operating the "selection ↑" key 53 or the "selection ↓" key 54.

The item selected according to the operation of the "selection ↑" key 53 or the "selection ↓" key 54 is displayed with background and characters being in a white-black reversed display mode (for example, with the characters in white and the background in black). Note that in FIGS. 6 to 8, for convenience of illustration, the background of the selected item is shown with slashes and the characters are shown in black. The example shown in FIG. 6(b) indicates that the state in which the item L2, "machine information", is selected by the operator. When the operator operates the "selection ↑" key 53 in the state shown in FIG. 6(b), the item L1, "various settings", can be selected. In this case, the background and characters of the item L1, "various settings", are displayed in a white-black reversed mode whereas the background and characters of the other items L2 and L3 are displayed normally (for example, with the characters in black and the background in white). When the operator operates the "selection ↓" key 54 in the state shown in FIG. 6(b), the item L3, "clock" can be selected. In this case, the background and characters of the item L3, "clock", are displayed in a white-and-black reversed display mode whereas the background and characters of the other items L1 and L2 are displayed in a normal display mode. In case that the operator operates the "selection ↑" key 53 or the "selection ↓" key 54 to select a desired item and performs decision operation with the "decision O" key 51, a setting screen that corresponds to the selected item is displayed on the display monitor 331. In case that the operator performs an abort operation with the "abort X" key 52 when the menu screen D2 is displayed, the display of the display monitor 331 is switched to the work screen D1.

FIG. 7(a) shows an example of the display that is displayed on the display monitor 331 as a setting screen. FIG. 7(a) shows an example of a clock setting screen D3, which is switched from the item L3, "clock", on the menu screen D2 shown in FIG. 6(b) as a result of the selection by the operator. On the clock setting screen D3 is displayed "year, month, day, hour, minute, second" at present moment. When the clock setting screen D3 is displayed, "O adjustment" and "X return" are displayed in the guide region R3. The display of "O adjustment" indicates that by operating the "decision O" key 51 contained in the display state switch commanding unit 334, the display state is switched to the clock adjustment screen for adjusting the year, month, day, and time of the present moment. The display of "X return" indicates that by operating the "abort X" key 52 contained in the display state switch commanding unit 334, the display state is switched from the clock setting screen D3 to the menu screen D2.

FIG. 7(b) shows an example of a clock adjustment screen D4. As shown in FIG. 7(b), the clock adjustment screen D4 displays items M1 to M6 that can be adjusted by the operator. The items M1 to M6 display numerical values that correspond to, for example, "year", "month", "day", "hour", "minute", and "second", respectively. When the clock adjustment screen D4 is displayed on the display monitor 331, "↑↓ selection", "←→ change", "O decision", and "X abort" are displayed on the guide region R4. That is, the operator can select any desired one of the six items M1 to M6 that can be set by operating the "selection ↑" key 53 or the "selection ↓" key 54.

The numerical value of the item selected by operation of the "selection ↑" key 53 or the "selection ↓" key 54 by the operator can be changed by the operation of the "selection ←" key 55 or the "selection →" key 56 by the operator. For example, for each time the "selection ←" key 55 is operated, the numerical value displayed in the selected item is decreased by 1 whereas for each time the "selection →" key 56 is operated, the numerical value displayed in the selected item is increased by 1. As shown in FIG. 7(b), in case that the item M2 indicating a numerical value of "month" is selected and the numerical value of the item M2 is 2, if the operator operates the "selection →" key 56, the numerical value of the item M2 is changed to 3 as shown in FIG. 7(c). Note that also in the case shown in FIG. 7(b), the item that the operator selected from the items M1 to M6 is displayed in a white-and-black reversed display mode. If the operator performs a decision operation with the "decision O" key 51 in this state, the numerical value of the item M2 is changed to 3, which then is set.

Figure 8:
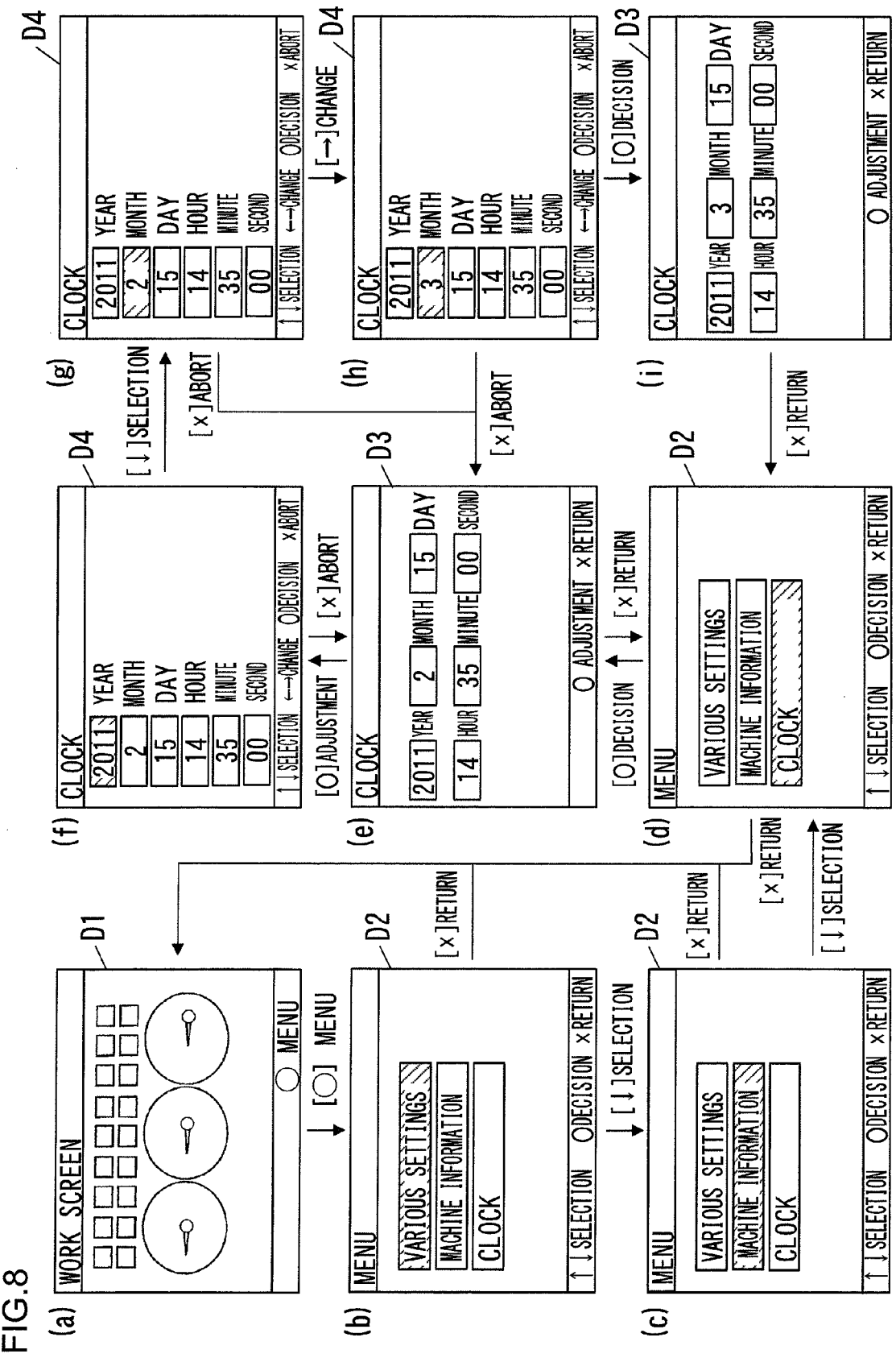
FIG. 8 presents a diagram showing how a screen displayed on a display monitor transitions according to an operation by the operator.

FIG. 8 shows the state of transition of the screen displayed on the display monitor 331 according to the operation by the operator of the display state switch commanding operation member 334. FIG. 8 shows a case in which time is changed as an example of the transition of the screen. FIG. 8(a) shows a case in which the work screen D1 is displayed on the display monitor 331. In this case, when the operator performs a decision operation with the "decision O" key 51, the display state switch commanding operation member 334 outputs an operation signal indicating that the "decision O" key 51 is operated to the controller 338. Then, the screen switching unit 335 switches the display state of the display monitor 331 from the work screen D1 to the menu screen D2 shown in FIG. 8(*b*) according to the input operation signal.

If the "selection ↓" key 54 is operated by the operator when the menu screen D2 shown in FIG. 8(*b*) is shown, the display state switch commanding operation member 334 outputs an operation signal indicating that the "selection ↓" key 54 is operated to the controller 338. Then, the screen switching unit 335 switches the menu screen D2 on the display monitor 331 to the menu screen D2 shown in FIG. 8(*c*) according to the input operation signal. That is, the screen switching unit 335 display the item L2, "machine information", in a white-and-black reversed display mode.

If the "selection ↓" key 54 is operated by the operator when the menu screen D2 shown in FIG. 8(*c*) is displayed, the display state switch commanding operation member 334 outputs an operation signal indicating that the "selection ↓" key 54 has been operated to the controller 338. Then, the screen switching unit 335 switches the menu screen D2 on the display monitor 331 to the menu screen D2 shown in FIG. 8(*d*) according to the input signal. That is, the screen switching unit 335 displays the item L3, "clock" in a white-and-black reversed display mode.

If the operator performs an abort operation with the "abort X" key 52 when any one of the menu screens D2 shown in FIGS. 8(*b*) to 8(*d*) is displayed, the display state switch commanding operation member 334 outputs an operation signal indicating that the "abort X" key has been operated to the controller 338. Then, the screen switching unit 335 switches the menu screen D2 on the display monitor 331 to the work screen D1 shown in FIG. 8(*a*).

If the "decision O" key 51 is operated by the operator when the menu screen D2 is displayed, that is, when the item L3, "clock", is selected, the display state switch commanding operation member 334 outputs an operation signal indicating that the "decision O" key 51 has been operated to the controller 338. Then, the screen switching unit 335 switches the display state of the display monitor 331 from the menu screen D2 to a clock setting screen D3 shown in FIG. 8(*e*).

If the "decision O" key 51 is operated when the clock setting screen D3 shown in FIG. 8(*e*) is displayed, the display state switch commanding operation member 334 outputs an operation signal indicating that the "decision O" key 51 has been operated to the controller 338. Then, the screen switching unit 335 switches the display state of the display monitor 331 from the clock setting screen D3 to a clock adjusting screen D4 shown in FIG. 8(*f*) according to the input operation signal. If the "abort X" key 52 is operated by the operator when the clock setting screen D3 is displayed, the display state switch commanding operation member 334 outputs an operation signal indicating that the "abort X" key 52 is operated to the controller 338. Then, the screen switching unit 335 switches the clock setting screen D3 on the display monitor 331 to the menu screen D2 shown in FIG. 8(*d*). according to the input operation signal.

If the "selection ↓" key 54 is operated when the clock adjusting screen D4 shown in FIG. 8(*f*) is displayed, the display state switch commanding operation member 334 outputs an operation signal indicating that the "selection ↓" key 54 has been operated to the controller 338. Then, the screen switching unit 335 switches the display on the display monitor 331 from the clock adjusting screen D4 shown in FIG. 8(*f*) to a clock adjusting screen D4 shown in FIG. 8(*g*) according to the input operation signal. That is, the screen switching unit 335 displays the item M2 in a white-and-black reversed display mode.

If the "selection →" key 56 is operated by the operator when the clock adjusting screen D4 shown in FIG. 8(*g*) is displayed, the display state switch commanding operation member 334 outputs an operation signal indicating that the "selection →" key 56 has been operated to the controller 338. Then, the screen switching unit 335 switches the display on the display monitor 331 to the clock adjusting screen D4 shown in FIG. 8(*h*). That is, the screen switching unit 335 displays the numerical value displayed by the item M2 after changing it from "2" to "3".

If the "decision O" key 51 is operated after the numerical value of the item M2 is changed as shown in FIG. 8(*h*), the display state switch commanding operation member 334 outputs an operation signal indicating that the "decision O" key 51 has been operated to the controller 338. Then, the screen switching unit 335 switches the display of the display monitor 331 from the clock adjusting screen D4 shown in FIG. 8(*h*) to a clock setting screen D3 shown in FIG. 8(*i*) according to the input operation signal. In the clock setting screen D3 shown in FIG. 8(*i*), a time on which the numerical value changed on the clock adjusting screen D4 is reflected is displayed as the present moment.

If the "abort X" key 52 is operated by the operator when the clock adjusting screen D4 shown in any one of FIGS. 8(*f*) to 8(*h*) is displayed, the display state switch commanding operation member 334 outputs an operation signal indicating that the "abort X" key 52 has been operated to the controller 338. Then, the screen switching unit 335 switches the display state of the display monitor 331 to the clock setting screen D3 shown in FIG. 8(*e*) according to the input operation signal.

In Case that Failure has Occurred

Then, explanation is made on a case in which a failure has occurred in any one of the buttons of the display switch button group 50. As mentioned above, the display control device 33 according to the present embodiment is configured such that if one button of the display state switch commanding operation member 334 is in failure, a substitution setting of one or more other buttons thereof can be made such that an operation to be operated with the one button is enabled with the one or more other buttons instead of the one button. For example, a configuration may be adopted such that when the "decision O" key 51 is in failure, the same operation as the operation with the "decision O" key 51 can be done by operating the "selection ↑" key 53 and the "selection ↓" key 54. That is, the operations of the "selection ↑" key 53 and the "selection ↓" key 54 constitutes the content of the substitute setting for the "decision O" key 51. Hereafter, explanation is made in detail on processing in case that a failure has occurred in the order of substitute setting processing, display state switching processing and date and time of occurrence of failure confirming processing.

(a) Substitute Setting Processing

When the substitute setting screen switch commanding operation member 333 is operated, the controller 338 confirms the date and time, on which the failure has occurred, to be confirmed as described later. Then, in cases (1) to (3) below, the screen switching unit 335 that is functionally provided in the controller 338 causes a substitute setting screen to be displayed on the display monitor 331. In a case other than the cases (1) to (3) below, the screen switching unit 335 does not cause any substitute setting screen to be displayed on the display monitor 331. Note that the substitute setting screen is a screen on which the operator selects and decides the content of substitute setting.

(1) A case in which no failure has occurred before;
(2) A case in which a failure that occurred previously has already been repaired; and (3) A case in which a failure occurred and N days (for example, 7 days) or more have not passed yet therefrom in a non-repaired state.

Figure 9:
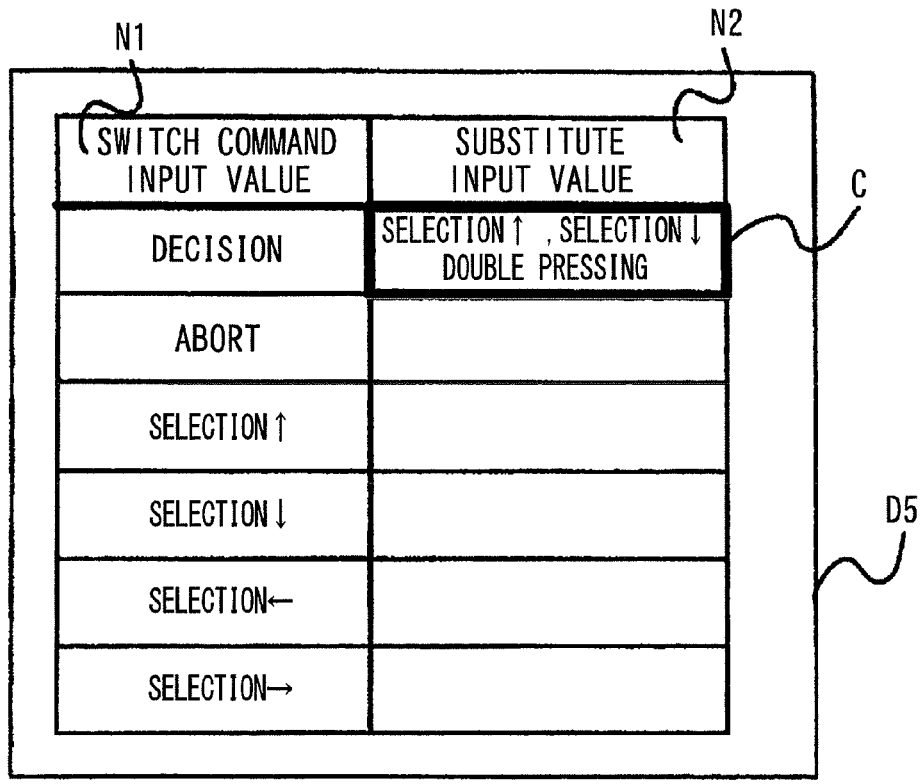
FIG. 9 presents a diagram showing an example of a display of a substitute setting screen.
Figure 9:
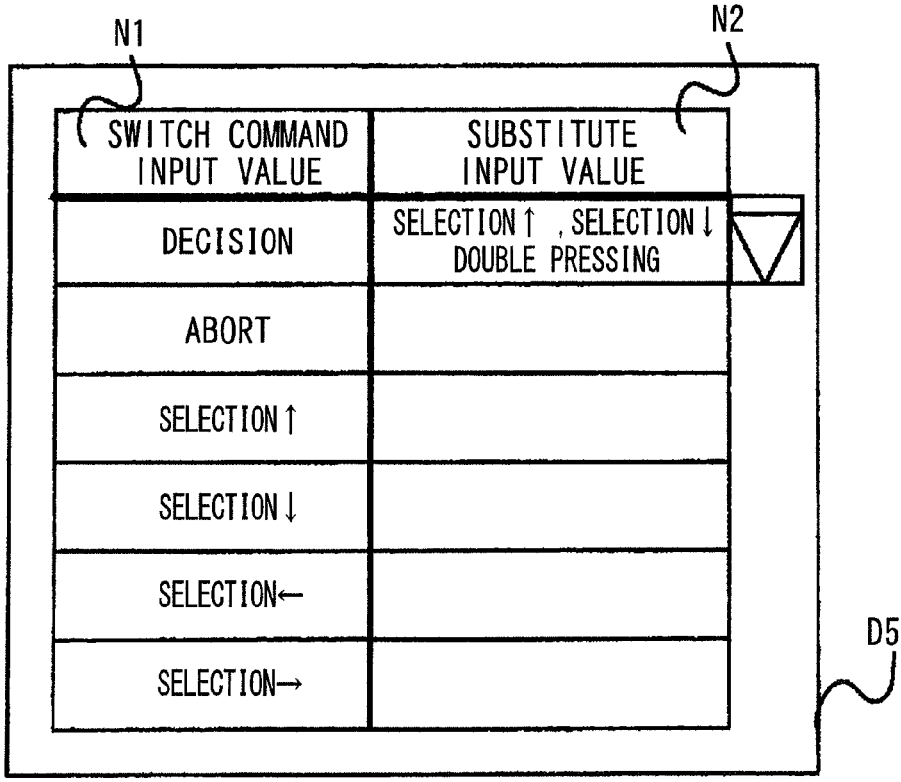

FIG. 9(a) shows an example of a substitute setting screen D5. On the substitute setting screen D5 are displayed a switch command input value N1, a substitution input value N2, and a cursor C. The switch command input value N1 indicates the contents of the operations that correspond to respective commands to be performed by the display state switch commanding operation member 334, that is, contents that correspond to the "decision O" key 51, the "abort X" key 52, "selection ↑" key 53, "selection ↓" key 54, "selection ←" key 55 or "the selection →" key 56, respectively. The substitution input value N2 indicates which button or buttons in the display switch button group 50 of the display state switch commanding operation member 334 is/are to be used to perform the content of the operation indicated by the switch command input value N1. On the substitute setting screen D5 shown in FIG. 9(a), it is indicated that the operation of the "decision O" key 51 is substituted by double pressing operation of the "selection ↑" key 53 and the "selection ↓" key 54. The operator performs an operation for the substitute setting on the substitute setting screen D5 by using a set value inputting operation member 332. The cursor C indicates a substitute input value N2 that is selected according to the operation of the set value inputting unit 332 by the operator.

Hereafter, explanation is made on the operation for substitute setting by the operator. The operator selects a substitute input value N2 that corresponds to the switch command input value N1 for which substitute inputting is performed by operating the "↑" key 41 or "↓" key 42 on the substitute setting screen D5. An example shown in FIG. 9(a) indicates that the substitute input value N2 that corresponds to the switch command input value N1 of "decision" is selected by the operator. It becomes possible to input the substitute input value N2 by a further operation by the operator of the set value inputting operation member 332 after the substitute input value N2 is selected and after the "O" key 45 is operated by the operator. That is, the operator can select a desired substitute operation as the substitute input value N2 by operating the "↑" key 41, the "↓" key 42, the "←" key 43, the "→" key 44, and the "O" key 45 out of the various set value input button group 40 that constitutes the set value inputting operation member 332. FIG. 9(a) indicates a case in which double pressing operation of the "selection ↑" key 53 and the "selection ↓" key 54 is performed by the operator.

As mentioned above, when after the operation by the operator of the set value inputting operation member 332 is performed and an input value decision operation is performed with the "finished" key 46 so that an operation signal is output from the set value inputting operation member 332, the controller 338 causes the substitute input value N2 to be decided as the content of the substitute setting. That is, the controller 338 causes the content of the substitute setting to be written in the substitute setting table TB shown in FIG. 10 and stored in the storing unit 337. In the substitute setting table TB are written a switch command input value and a substitute input value. The switch command input value indicates the display switch button group 50 of the substitute state switch commanding operation member 334 for which one or more other buttons substitute, that is, the display switch button group 50 that is currently in failure. The substitute input value indicates the display switch button group 50 that is used in substitution instead of the display switch button group 50 of the display state switch commanding operation member 334 that is written in the switch command input value, that is, the display switch button group 50 that is set on the substitute setting screen D5. The example of the substitute setting table TB shown in FIG. 10 indicates that the operation of the "decision O" key 51 is substituted by double pressing operation of the "selection ↑" key 53 and the "selection ↓" key 54. Furthermore, the controller 338 causes a substitute setting flag that indicates that a substitute setting is effectively done to be turned ON and stored in the storing unit 337.

(b) Display State Switch Processing

Explanation is made on display state switch processing of the display monitor 331 by the display control device 33 when substitute setting processing is performed. In case that the substitute setting processing is performed, when the operator operates the display state switch commanding operation member 334 according to the operation content that is set by the substitute setting processing, the display control device 33 executes the display state switch processing of the above-mentioned display monitor 331. That is, in case that the substitute setting is performed on the substitute setting screen D5 as shown in FIG. 9(a), the operator may perform double pressing operation of the "selection ↑" key 53 and the "selection ↓" key 54 instead of the operation of the "decision O" key 51 when performing transition of the screen that is explained referring to FIG. 8. In this case, when an operation signal is output according to the operation by the operator of the display state switch commanding operation member 334, the input value judging unit 336 judges whether or not the substitute setting flag stored in the storing unit 337 is set ON. When the substitute setting flag is set ON, the input value judging unit 336 judges whether or not the input operation signal corresponds to an input value written in the substitute setting table TB.

For example, when the operation signal output from the display state switch commanding operation member 334 corresponds to the operation of the "selection →" key 56, the input value judging unit 336 refers the substitute input value written in the substitute setting table TB. In the substitute setting table TB shown in FIG. 10, "selection →" is not written in the substitute input value, so that the controller 338 executes processing according to the input operation signal, that is, the processing according to the operation of the "selection →" key 56.

Also, in the case in which the operation signal output from the display state switch commanding operation member 334 corresponds to the double pressing operation of the "selection ↑" key 53 and the "selection ↓" key 57, the input value judging unit 336 likewise refers to the substitute input value written in the substitute setting table TB. In the substitute setting table TB shown in Table 10, the double pressing operation of the "selection ↑" key 53 and the "selection ↓" key 57, that is, the same input value as that of the input operation signal is written in the substitute setting table TB as a substitute input value. In this case, the controller 338 executes a processing that corresponds to the switch command input value written according to the substitution input value, that is, according to the operation of the decision O" key 51. As a result, even when the "decision O" key 51 is in failure, the operator can perform display switch of the screen as shown in FIG. 8 by performing the double pressing operation of the "selection ↑" key 53 and the "selection ↓" key 57.

(c) Failure Occurrence Date Confirming Processing

Explanation is made on failure occurrence date confirming processing that is performed before the controller 338 displays the substitute setting screen D5 when the substitute setting screen switch commanding operation member 333 is operated by the operator. The storing unit 337 stores the failure occurrence date as mentioned above. The failure occurrence date is set to a default value and stored at the time of delivery of the hydraulic excavator 10. When the substitute setting processing mentioned above is performed, the controller 338 causes the failure occurrence date to be changed from the default value to the date on which substitute setting processing has been performed and stored in the storing unit 337. When the failure has been repaired after the occurrence of the failure, the controller 338 causes, after the repair condition confirming processing described later to be executed, the failure occurrence date to be set again to the default value and stored in the storing unit 337

As mentioned above, when an operation signal is output according to the operation of the substitute setting screen switch commanding operation member 333 by the operator, the controller 338 refers to the failure occurrence date stored in the storing unit 337. When the failure occurrence date referred to is the default value, that is, when no failure has occurred or the failure previously occurred has been repaired, the screen switching unit 335 causes the display monitor 331 to display the substitute setting screen D5. When the failure occurrence date stored in the storing unit 337 is not the default value, the display switching unit 335 causes the monitor 331 to display a repair condition confirming screen. Then, when it is judged by the controller 338, as a result of the repair condition confirming processing, that the display state switch commanding operation member 334 is in failure and N days or more has not passed from the failure occurrence date, the screen switching unit 335 causes the display monitor 331 to display the substitute setting screen D5.

Figure 11:
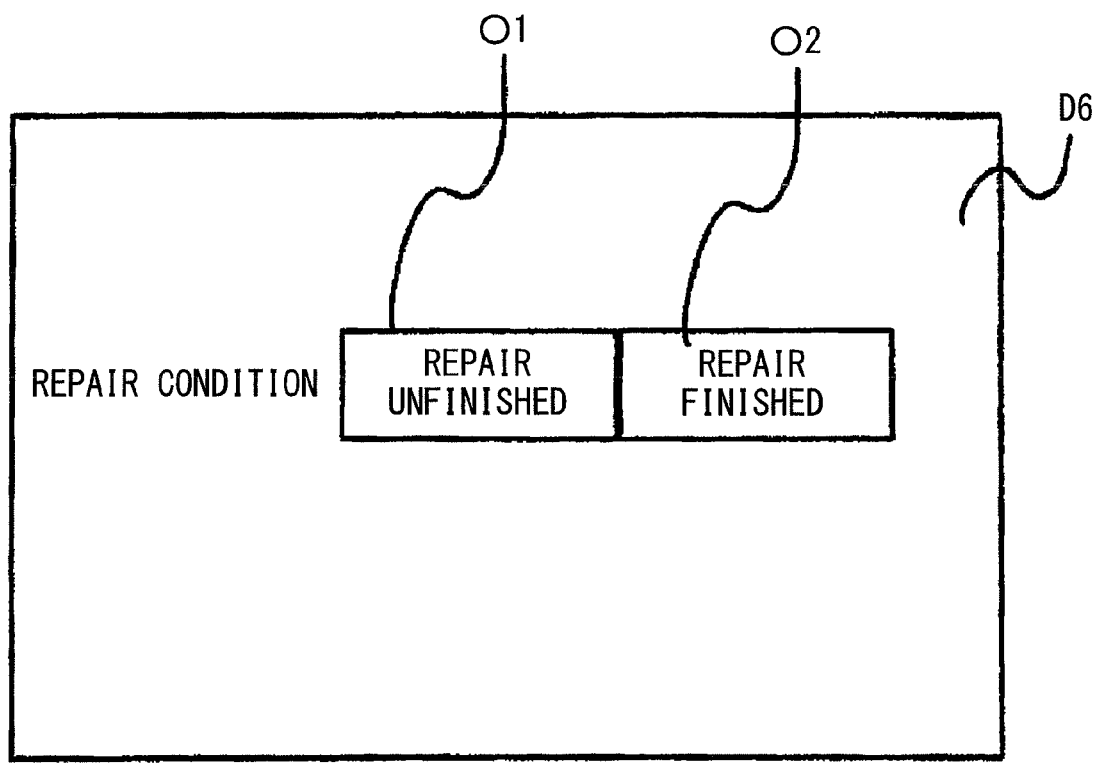
FIG. 11 presents a diagram showing an example of a display of a restoration conditions confirming screen.

FIG. 11 shows an example of a repair condition confirming screen D6 for performing repair condition confirming processing. The repair condition confirming screen D6 is a screen on which setting of the repair condition of the display state switch commanding operation member 334 is performed. As shown in FIG. 11, on the repair condition confirming screen D6 are displayed "repair unfinished" O1 and "repair finished" O2 as items indicating repair conditions. When the repair of the display state switch commanding operation member 334 has been finished, the operator operates the "←" key 43 or the "→" key 44 to select the item O2, "repair finished", and performs an input value deciding operation with the "finished" key 46. When an operation signal is output from the setting inputting operation member 332 according to the operation by the operator, the controller 338 sets finish of the failure repair of the display state switch commanding operation member 334. That is, the controller 338 causes the substitute setting flag to be set to OFF, the failure occurrence date to be set to a default value, and the substitute setting table TB to be cleared (canceled) and the both to be stored in the storing unit 337.

When the repair of the display state switch commanding operation member 334 has not been finished, the operator selects the item O1, "repair unfinished" by operating the "←" key 43 or the "→" key 44 of the setting inputting unit 332 and performs input value deciding operation with the "finished" key 46. When an operation signal is output from the setting inputting operation member 332 according to the operation by the operator, the controller 338 judges that the display state switch commanding operation member 334 is in failure and refers to the failure occurrence date stored in the storing unit 337. Then, as mentioned above, the controller 338 judges whether or not N days or more have passed from the failure occurrence date. In this case, the controller 338 calculates a difference between the date on which an operation signal is input (that is, the present date and time) and the failure occurrence date stored in the storing unit 337 and judges whether the obtained difference is equal to or more than N days. When N days or more have not passed from the failure occurrence date, the display switching unit 335 causes the display monitor 331 to display the substitute screen D5 as mentioned above. When N days or more have passed from the failure occurrence date, the display switching unit 335 does not cause the display monitor 331 to display the substitute setting screen D5 thereon. In other words, the substitute setting, according to which instead of one button that is in failure in the display switch button group 50, one or more other buttons are used for the operation, is prohibited.

Explanation is made on the processing of the display control device 33 according to an embodiment by using the flowcharts shown in FIGS. 12 to 15. Each processing in FIGS. 12 to 15 is performed by executing a program in the controller 338. The program that performs each processing in FIGS. 12 to 15 is stored in a memory (not shown). When power of the display control device 33 is turned on, the program is started up and executed by the controller 338.

Figure 12:
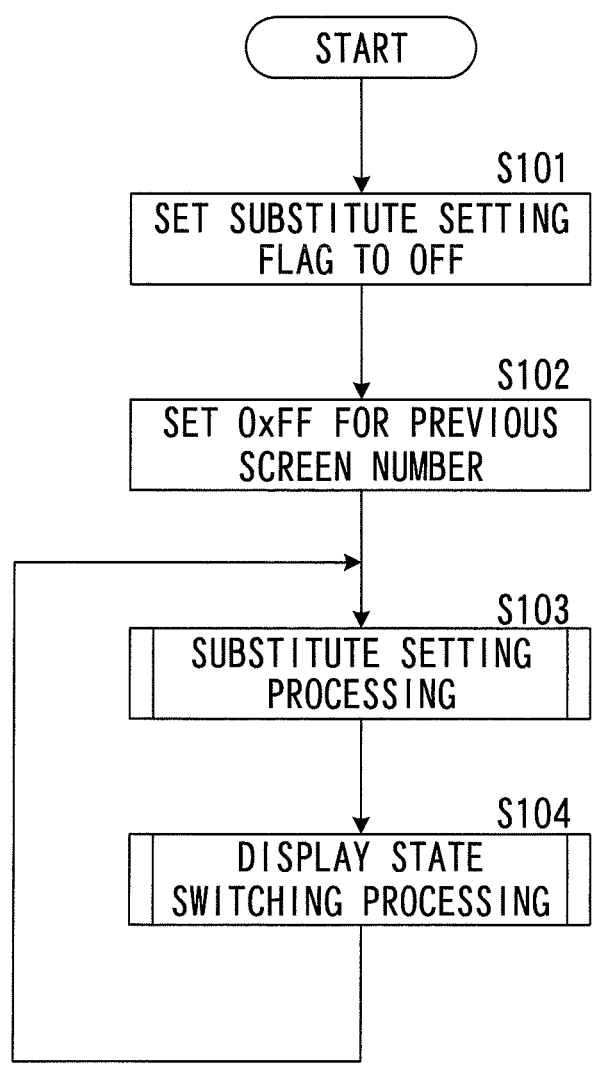
FIG. 12 presents a flowchart explaining processing of the display control device.

In step S101 in FIG. 12, the controller 338 causes the substitute setting flag to be set to OFF, that is, causes the substitute setting to be invalidated, and causes the substitute setting flag to be stored in the storing unit 337. Then, the program proceeds to step S102. In step S102, the controller 338 causes a value "0xFF" as a previous screen number that indicates that switching to a substitute setting has not been performed to be stored in the storing unit 337, and the program proceeds to step S103. In step S103, the substitute setting processing described later is performed and the program proceeds to step S104. In step S104, the screen switching unit 335 of the controller 338 executes the display state switching processing described later and the program returns to step S103.

Figure 13:
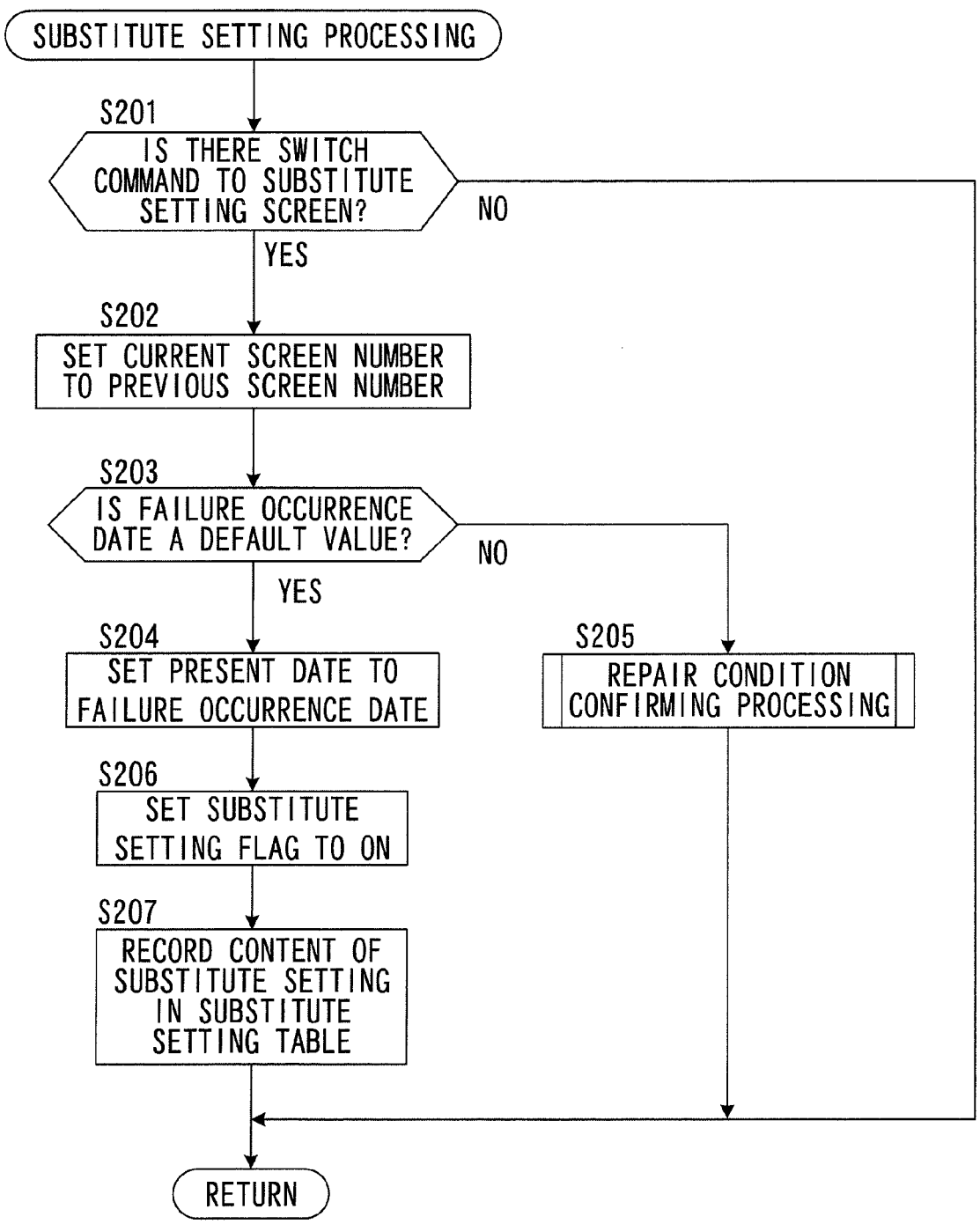
FIG. 13 presents a flowchart explaining processing of the display control device.

Then, explanation is made on the substitute setting processing in step S103 referring to the flowchart shown in FIG. 13. In step S201 in FIG. 13, the input value judging unit 335 judges whether or not the switching operation to the substitute setting screen D5 has been performed. When the switching operation to the substitute setting screen D5 has been performed, that is, when an operation signal from the substitute setting screen switch commanding operation member 333 is input, a positive judgment is made in step S201 and the program proceeds to step S202. When the switching operation to the substitute setting screen D5 has not been performed and an operation signal from the substitute setting screen switch commanding operation member 333 is not input, a negative judgment is made by the input value judging unit 335 in step S201 and the program returns to step S104.

In step S202, the controller 338 causes the screen number currently displayed on the display monitor 331 (that is, displayed application number) to be set at the previous screen number and the program proceeds to step S203. In step S203, the controller 338 judges whether or not the failure occurrence date stored in the storing unit 337 is a default value or not. When the failure occurrence date is not the default value, a negative judgment is made by the controller 338 in step S203 and repair condition confirming processing is performed in step S205 described later and the program returns to step S104 in FIG. 12. When the failure occurrence date is the default value, a positive judgment is made by the controller 338 in step S203 and the program proceeds to step S204.

In step S204, the controller 338 causes the failure occurrence date to be changed to the current date and stored in the storing unit 337, and then the program proceeds to step S206. In step S206, the screen switching unit 335 causes the substitute setting flag to be changed to ON and stored in the storing unit 337, and the program proceeds to step S207. In step S207, the screen switching unit 335 causes the display monitor 331 to display the substitute setting screen D5. Then, the controller 338 causes the content according to the substitute setting value that is set on the substitute setting screen D5 to be written in the substitute setting table TB and stored in the storing unit 337. Then, the program returns to step S104.

Figure 14:
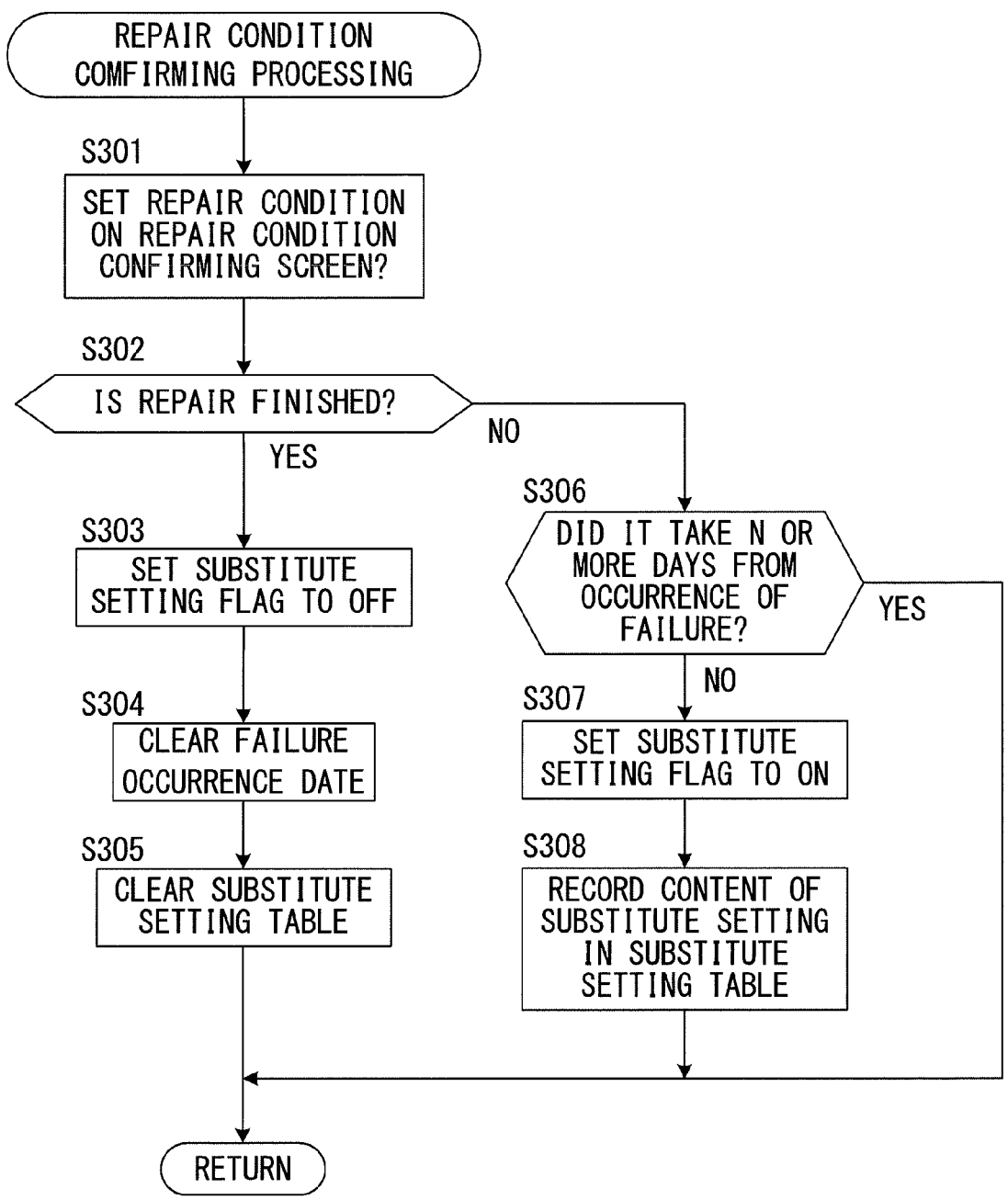
FIG. 14 presents a flowchart explaining processing of the display control device.

Explanation is made on the repair condition confirming processing in step S205 by using the flowchart in FIG. 14. In step S301, the screen switching unit 335 causes the display monitor 331 to display a repair condition confirming screen D6. Then, the controller 338 causes the repair condition of failure that is set on the repair condition confirming screen D6, that is, failure repair finished or failure repair unfinished to be set on the repair condition confirming screen D6, and the program proceeds to step S302. In step S302, the controller 338 judges whether or not the repair has been finished. When the repair of failure has been finished, that is, when failure repair finished has been set in step S301, a positive judgment is made by the controller 338 in step S302, and the program proceeds to step S303. When the repair of failure has not been finished, that is, failure repair unfinished has been set in step S301, a negative judgment is made by the controller 338 in step S302, and the program proceeds to step S306.

In step S303, the controller 338 causes the substitute setting flag to be set to OFF and stored in storing unit 337, and the program proceeds to step S304. In step S304, the controller 338 causes the failure occurrence date to be set to a default value and stored in the storing unit 337, and the program proceeds to step S305. In step S305, the controller 338 causes the substitute setting table TB to be cleared, and the program returns to step S104.

When a negative judgment is made in step S302, it is judged by the controller 338 in step S306 whether or not N or more days have passed from the failure occurrence date. When N or more days have passed from the failure occurrence date stored in the storing unit 337 to the present date, a positive judgment is made by the controller 338, and the program returns to step S104 in FIG. 12. When N or more days have not passed yet from the failure occurrence date, a negative judgment is made by the controller 338, and the program proceeds to step S307. Each processing in step S307 (substitute setting flag ON) and step S308 (writing in substitute table TB) are identical to that in step S205 (substitute setting flag ON) and that in step S206 (writing in substitute table TB), respectively. When the processing in step S308 is finished, the program returns to step S104 in FIG. 12.

Figure 15:
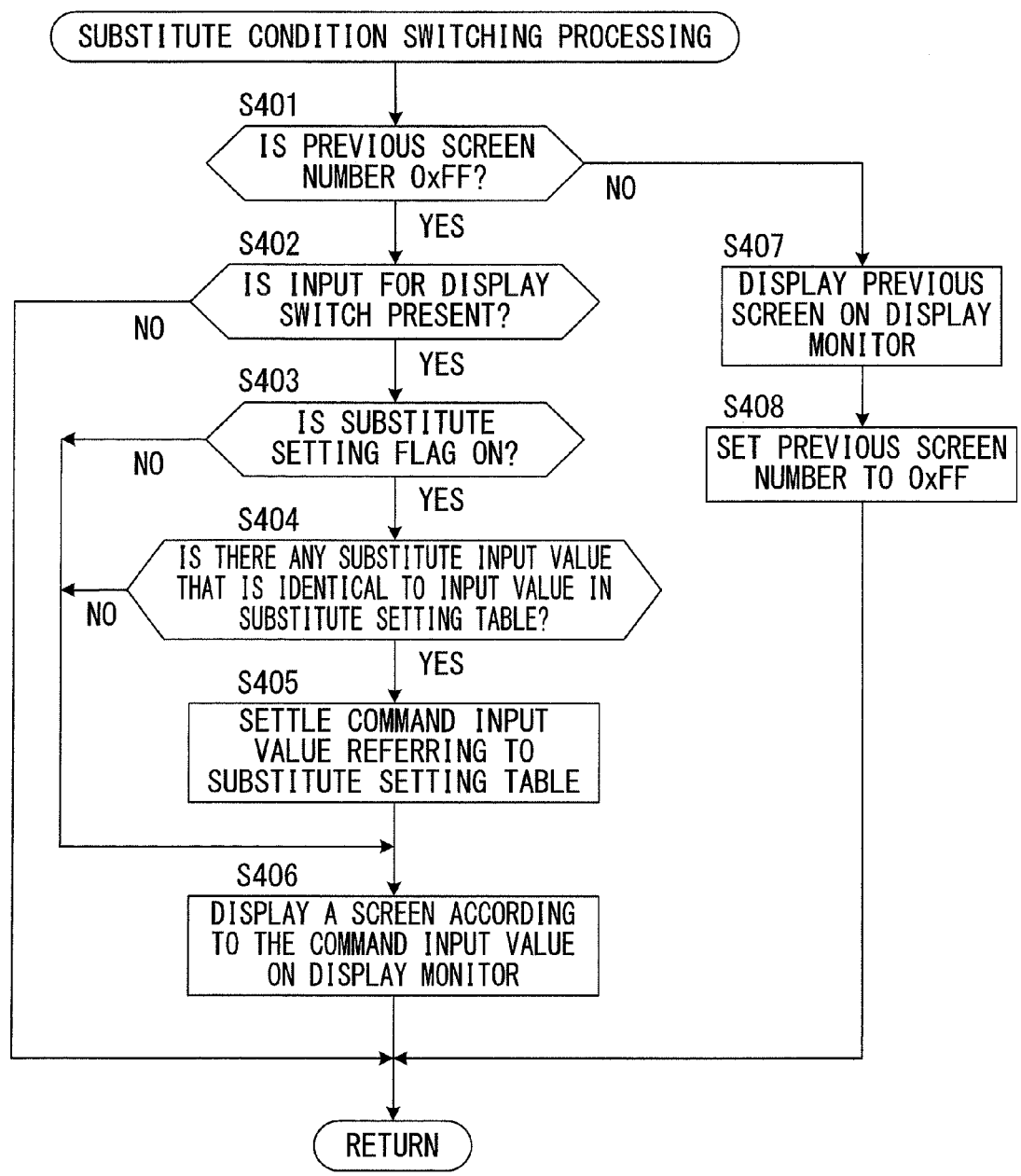
FIG. 15 presents a flowchart explaining processing of the display control device.

Explanation is made on the display state switching processing in step S104 by using the flowchart in FIG. 15. In step S401, the controller 338 judges whether or not the previous screen number is set to "0xFF" indicating that switching to the substitution screen is not to be performed. When the previous screen number is set to "0xFF", a positive judgment is made by the controller 338, and the program proceeds to step S402. When the previous screen number is not set to "0xFF", a negative judgment is made by the controller 338, and the program proceeds to step S407. In step S407, the screen switching unit 335 causes the display monitor 331 to display a screen corresponding to the previous screen referring to the previous screen number and in step S408, the controller 338 causes the previous screen number to be set to "0xFF". Then, the program returns step S103 in FIG. 12.

In step S402, it is judged whether or not the display state switch commanding operation member 334 is operated by the operator. When no operation signal from the display state switch commanding operation member 334 is input, a negative judgment is made by the controller 338 in step S402, and the program returns to step S103 in FIG. 12. When an operation signal from the display state switch commanding operation member 334 is input, a positive judgment is made by the controller 338 in step S402, and the program proceeds to step S403.

In step S403, it is judged whether or not the substitute setting flag is set to ON. When the substitute flag is set to ON, a positive judgment is made by the controller 338 in step S403, and the program proceeds to step S404. When the substitute setting flag is set to OFF, a negative judgment is made by the controller 338, and the program proceeds to step S406, by skipping steps S404 and S405.

In step S404, the input value judging unit 336 judges whether or not an input value according to the operation signal, which is input in step S402, corresponds to the substitute input value in the substitute setting table TB stored in the storing unit 337. When the input value according to the operation signal corresponds to the substitute input value in the substitute setting table TB, a positive judgment is made by the input value judging unit 336, and the program proceeds to step S405. When the input value according to the operation signal does not correspond to the substitute input value in the substitute setting table TB, a negative judgment is made by the input value judging unit 336. Then, the program proceeds to step S406 by skipping step S405.

In step S405, the input value judging unit 336 causes the substitute setting input value, which corresponds to the input value according to the operation signal referring to the substitute setting table TB, to be settled as an input command that is input by the operator, and the program proceeds to step S406. In step S406, the input value judging unit 336 judges the input command and the screen switching unit 335 causes the display monitor 331 to display a screen according to the input command that is judged by the input value judging unit 336, and the program returns to step S103 in FIG. 12.

According to the display control device according to the embodiment explained above, the following operations and advantageous effects can be obtained.

(1) The screen switching unit 335 controls the display content of a screen containing various pieces of information. The display state switch commanding operation member 334 has, for each of the various screens, a display switch button group 50 consisting of a plurality of keys 51 to 56 that receive a plurality of operated inputs. The set value inputting operation member 332 receives operated input for performing substitute setting, according to which instead of an operation command from one of the plurality of keys 51 to 56, that from one or more other keys than the one is used. When an operated input for starting the substitute setting is received by the substitute setting screen switch commanding operation member 333, the controller 338 causes the substitute setting screen D5 to be displayed and the content of the substitute setting to be decided according to the operated input that is received by the set value inputting operation member 332. Then, when the operated input accepted by the display state switch commanding operation member 334 corresponds to the content of substitute setting that is set by the controller 338, the screen switching unit 335 causes the display of the screen to be controlled according to the content of the substitute setting. Therefore, the operation of a button 50 in the display switch button group 50 that is in failure can be made up by using one or more other buttons in the display switch button group 50 that are different than that one button and free of failure, so that the display of the screen can be switched. As a result, even when the display switch button group 50 for performing various operations for the display screen of the display monitor 331 cannot be repaired at once or even when the hydraulic excavator 10 cannot be stopped, the work can be continued without stopping the hydraulic excavator.

(2) When N or more days has passed from the setting of the content of the substitute setting by the controller 338 to the acceptance of the operated input by the substitute setting screen switch commanding operation member 333, the screen switching unit 335 causes the substitute setting screen D5 not to be displayed. In other words, since the content of the substitute setting becomes invalid, it can be prevented to use the hydraulic excavator 10 for a long period of time in a state in which the display state switch commanding operation member 334 remains in failure.

The display control device according to the embodiment described above may be modified as follows.

(1) The display control device may be configured such that the content of substitute setting is selectable from a plurality of contents of substitute setting instead of the one that is set according to the operation of the substitute value inputting operation member 332. In this case, for each switch command input value N1, a plurality of substitute setting contents are registered in advance. As shown in FIG. 9(b), when the "↑" key 41 or the "↓" key 42 is operated by the operator and a substitute input value N2 that corresponds to the switch command input value N1 for "decision" is selected, the plurality of registered substitute setting contents are displayed in the form of a pull-down menu. The operator selects a desired substitute setting content from the displayed pull-down menu by operating the "←" key 43 or the "→" key 445. Also, FIG. 9(b) shows a case in which double pressing operation for the "selection ↑" and "selection ↓" by the operator is selected as a content of the substitute setting. Then, when an input value deciding operation is performed with the "finished" key 46, the controller 338 causes the selected substitute input value N2 to be set as a content of the substitute setting.

(2) The set value inputting operation member 332 and the display state switch commanding operation member 334 may be constituted by a touch panel. That is, by touching the touch panel, the operator can perform operated input that is similar to the operated input of the set value input button group 40 of the set value inputting operation member 332 and the operated input of the display switch button group 50 of the display state switch commanding operation member 334.

(3) According to one aspect of the present invention, instead of the display state switch commanding operation member 334 that includes the "selection ↑" key 53, the "selection ↓" key 54, the "selection ←" key 55, and the "selection →" key 56, the display state switch commanding operation member 334 may be configured to include at least one of the four different keys mentioned above. For example, when the display state switch commanding operation member 334 includes only the "selection →" key 56, a configuration may be adopted such that when the numerical value indicating the "month" in the item M2 in FIG. 7(b) reaches the upper limit, that is, 12 according to the operation of the "selection →" key 56, the numerical value indicating "day" in the item M3 underlying the item M2 is turned to be changeable.

As far as the features of the present invention are not damaged, the present invention is not limited to the embodiments described above and other embodiments conceivable within the technical concept of the present invention are included in the scope of the present invention. The embodiments and variation examples explained above may be combined with each other as appropriate.

The disclosure of the following priority application is herein incorporated by reference:
Japanese Patent Application No. 2012-033995 (filed on Feb. 20, 2012).

The invention claimed is:

1. A display control device for a construction machine, comprising:
    a first operation member group having a plurality of operation members that receive a plurality of kinds of first operated input, respectively, for a screen;
    a second operation member group that receives a second operated input for performing a substitute setting in which one of the plurality of kinds of first operated input by one operation member of the plurality of operation members is substituted by an input by another operation member;
    a third operation member that receives a third operated input for starting the substitute setting; and
    a controller configured to control a display content of the screen including various pieces of information, to cause a substitute setting screen for performing the substitute setting in response to the third operated input to be displayed and to decide a content of the substitute setting according to the second operated input on the substitute setting screen, wherein:
    when the first operated input received by the first operation member group corresponds to the content of the substitute setting that is decided, the controller controls display of the screen according to the content of the substitute setting; and
    when a number of days from a time when the content of the substitute setting is decided to a time when the operated input by the third operation member is received is equal to or more than a predetermined number of days, the controller does not perform the display of the substitute setting screen.

2. A display control device for a construction machine according to claim 1, wherein:
    the controller is further configured to cancel the content of the substitute setting that is set.

3. A display control device for a construction machine according to claim 1, wherein:
    the controller is configured to decide a content of substitute setting out of the contents of the substitute setting, according to the second operated input.

4. A display control device for a construction machine according to claim 1, further comprising:
    storage medium that stores the content of the substitute setting decided by the controller, a flag indicating that the substitute setting is valid, and a date on which the substitute setting is decided, wherein:
    the controller is configured to prohibit start of the substitute setting when a difference between the date that is stored in the storage medium and a date on which the operated input by the third operation member is received is equal to or more than the predetermined number of days.

5. A display control device for a construction machine according to claim 2, further comprising:
    storage medium that stores the content of the substitute setting decided by the controller, a flag indicating that the substitute setting is valid, and a date on which the substitute setting is decided, wherein:
    the controller is configured to clear the content of the substitute setting, the flag, and the date that are stored in the storage medium.

6. A display control device for a construction machine according to claim 2, wherein:
    the first operation member group includes a selecting operation member for selecting a setting of display state switching of the screen, a deciding operation member for deciding the setting that is selected by the selecting operation member, and a canceling operation member for canceling the setting decided with the deciding operation member.

7. A display control device for a construction machine according to claim 1, wherein:
the second operation member group includes an input value selecting operation member for selecting an input value for the substitute setting, and an input value deciding operation member for deciding the input value selected with the input value selecting operation member.

* * * * *